(12) United States Patent
Broekhuijsen

(10) Patent No.: US 8,504,579 B1
(45) Date of Patent: Aug. 6, 2013

(54) FILTERING A DATA SET USING TREES ON A COMPUTING DEVICE

(75) Inventor: Jerome Broekhuijsen, Highland, UT (US)

(73) Assignee: Crimson Corporation, Dover, DE (US)

( * ) Notice: Subject to any disclaimer, the term of this patent is extended or adjusted under 35 U.S.C. 154(b) by 223 days.

(21) Appl. No.: 12/982,532

(22) Filed: Dec. 30, 2010

Related U.S. Application Data

(60) Provisional application No. 61/327,569, filed on Apr. 23, 2010.

(51) Int. Cl.
*G06F 7/00* (2006.01)
*G06F 17/30* (2006.01)

(52) U.S. Cl.
USPC .......................................... 707/754

(58) Field of Classification Search
None
See application file for complete search history.

(56) References Cited

U.S. PATENT DOCUMENTS

| | | | |
|---|---|---|---|
| 6,539,391 B1 * | 3/2003 | DuMouchel et al. | 1/1 |
| 2006/0271884 A1 * | 11/2006 | Hurst | 715/854 |
| 2007/0174254 A1 * | 7/2007 | Toong et al. | 707/3 |
| 2010/0204921 A1 * | 8/2010 | Kishore et al. | 702/19 |

OTHER PUBLICATIONS deviantART, "Where Art Meets Application," http://www.deviantart.com/, accessed Mar. 21, 2011.

* cited by examiner

*Primary Examiner* — Uyen Le
(74) *Attorney, Agent, or Firm* — Austin Rapp & Hardman

(57) ABSTRACT

A computing device configured for filtering a data set is described. The computing device includes a processor and executable instructions stored in memory that is in electronic communication with the processor. The computing device obtains a data set. The computing device also selects nodes from multiple trees to produce a node selection. The computing device further generates a composite filter based on the node selection. The computing device additionally filters the data set based on the composite filter to produce a working data set.

19 Claims, 9 Drawing Sheets

FILTERING A DATA SET USING TREES ON A COMPUTING DEVICE

RELATED APPLICATIONS

This application is related to and claims priority from U.S. Provisional Patent Application Ser. No. 61/327,569, filed Apr. 23, 2010, for "FILTERING DATASETS BY SELECTIONS FROM MULTIPLE TREES," which is incorporated herein by reference.

TECHNICAL FIELD

The present disclosure relates generally to computers and computer-related technology. More specifically, the present disclosure relates to filtering a data set on a computing device.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Many computers may be connected to such networks. A computer network may include hundreds or even thousands of computers.

As the use of computers has increased, so has the amount of data generated and used by computers. Managing large amounts of diverse kinds of data is one current challenge. For example, providing solutions for managing, traversing, storing and accessing data in a user-friendly manner can be particularly difficult. As illustrated by this discussion, improved systems and methods for managing data may be beneficial.

DETAILED DESCRIPTION

Figure 1:
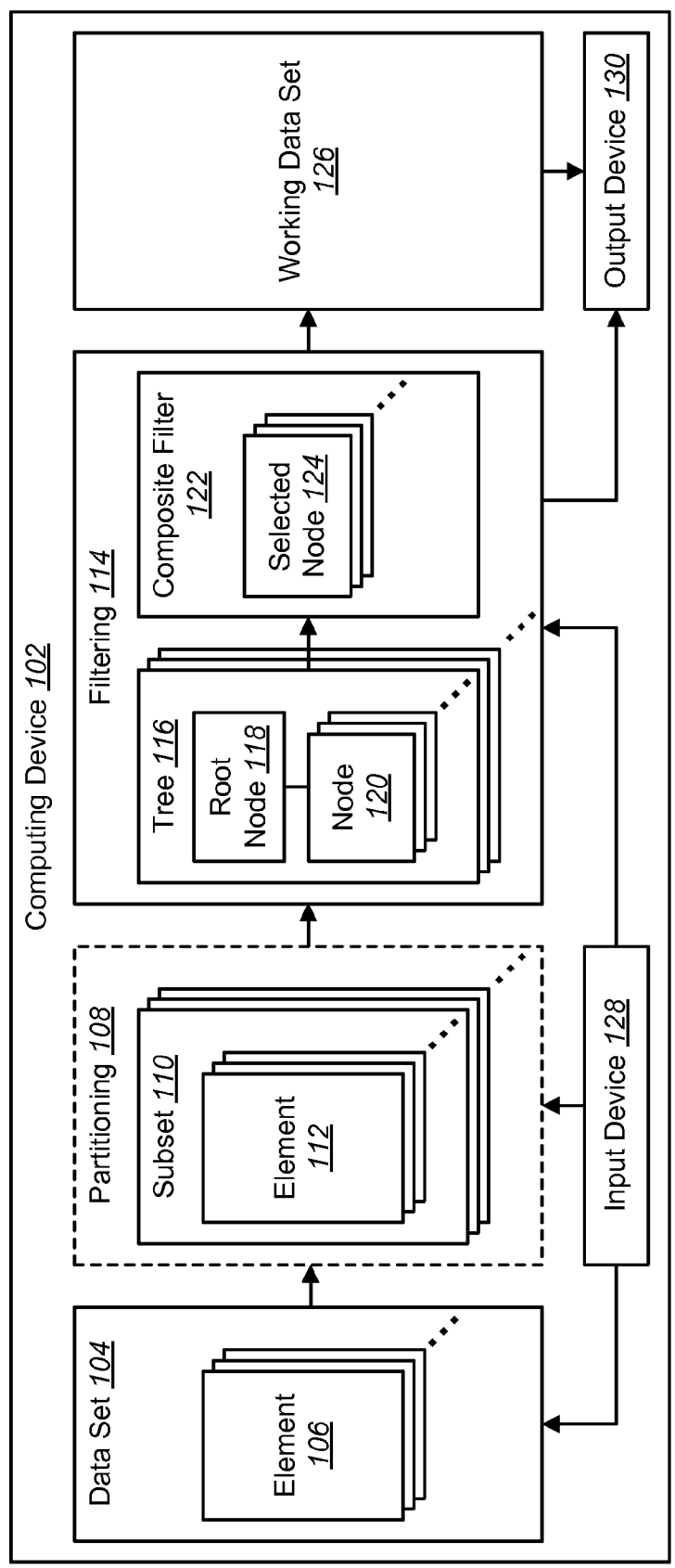
FIG. 1 is a block diagram illustrating one configuration of a computing device in which systems and methods for filtering a data set may be implemented.

A computing device configured for filtering a data set is disclosed. The computing device includes a processor and executable instructions stored in memory that is in electronic communication with the processor. The computing device obtains a data set. The computing device also selects nodes from multiple trees to produce a node selection. The computing device additionally generates a composite filter based on the node selection. The computing device further filters the data set based on the composite filter to produce a working data set. The computing device may also provide the working data set to an output device. The computing device may also regenerate at least one tree based on the node selection.

The computing device may also partition the data set into multiple subsets. Each subset may exclusively contain at least one element of the data set. The computing device may also generate the multiple trees corresponding to the multiple subsets. The computing device may also generate the multiple trees based on the data set.

The computing device may also receive an input. Selecting nodes may include selecting at least one node based on the input. The computing device may also modify the node selection based on the input.

A method for filtering a data set is also disclosed. The method includes obtaining a data set. The method also includes selecting, on a computing device, nodes from multiple trees to produce a node selection. The method additionally includes generating, on the computing device, a composite filter based on the node selection. The method further includes filtering the data set based on the composite filter to produce a working data set.

A non-transitory tangible computer-readable medium for filtering a data set is also disclosed. The computer-readable medium includes executable instructions for obtaining a data set and selecting nodes from multiple trees to produce a node selection. Executable instructions are also included on the computer-readable medium for generating a composite filter based on the node selection and filtering the data set based on the composite filter to produce a working data set.

The systems and methods disclosed herein may allow for filtering data sets by selections from multiple trees on a computing device. Multivariate data sets (e.g., highly attributed objects, the results of "join" database operations, etc.) often have a cardinality that may be difficult to manage, explore, or understand. Filters may be employed and presented to users for manipulation to reduce these cardinalities into more specific and manageable portions. Such filters are often presented as lists or trees of information (e.g., attributes). The systems and methods disclosed herein may employ multiple trees, working in tandem, to filter such large and multivariate data sets.

Selections from multiple trees may be used for filtering a large data set. In one configuration, each tree in a filtering set may be rooted by a node corresponding to "All," which effectively is a null filter (everything passes this filter, for example). Below the "All" node is a hierarchy of elements (e.g., attributes, properties and/or values) found in the data set. A tree may be navigated in order to select a node of the tree. A node within that tree may be selected in order to produce one component of a composite filter (e.g., "filter pack") that may be used to filter the data set. The resulting working data set may include all of the data that passes the filter prescribed by the selected node in the tree. Multiple trees may be used to form a composite filter (e.g., filter pack), where each tree contributes to one or more aspects of the composite filter.

In one configuration, a given element (e.g., attribute, property and/or value) might be found in more than one of the trees. However, the composite filter's effect is particularly predictable (hence, useful and usable) when there is a strict partition of elements (e.g., attributes, properties, and/or values) such that the existence of such an element (e.g., attribute, property, and/or value) is limited to at most one of the multiple trees forming the composite filter. Further, while a given element (e.g., attribute, property, and/or value) may be assigned to at most one tree, a given tree may have multiple elements (e.g., attributes, properties, and/or values). For example, a pool of n elements (e.g., attributes, properties, and/or values) can map to at most n trees. However, fewer than n trees may be used, with a given tree hosting multiple elements (e.g., attributes, properties, and/or values). For example, a pool of n attributes may be strictly partitioned into sets to be assigned to m (where m<n) trees.

In one configuration, such partitioning may be done using logical semantic groupings of the elements (e.g., attributes, properties and/or values). Often, this occurs when there are "hidden" elements (e.g., elements that may be understood by a human but not expressly represented in the data). For instance, assume that a data set includes several attributes, including color, body style, brand, model, year, gender, age, rating, region and distance attributes. These attributes may be partitioned into three (sub) sets, including a set of attributes that apply to a car, another set of attributes that apply to a driver, and yet another set of attributes that apply to a commute. For example, the "car" set of attributes may include color, body style, brand, model and year attributes. The "driver" set of attributes may include gender, age and rating attributes. Furthermore, the "commute" set of attributes may include region and distance attributes.

In one configuration of the systems and methods disclosed herein, there are three primary entities: product, computer and license. Each of these entities has its own set of attributes. Consequently, one tree may be created for each of the primary entities, each tree containing the elements (e.g., attributes, properties and/or values) logically associated with that primary entity.

According to the systems and methods disclosed herein, filters (in a composite filter, for example) may be used according to two approaches (e.g., modes or sequences). These two approaches may be referred to as "independent" and "cascading" (e.g., parallel and in series, respectively). In the independent approach, trees may work in isolation from each other. For example, a selection in one tree does not affect the structure or contents of any other trees. One advantage of this approach is that the computational burden is relatively light. For instance, other trees do not need to be recomputed and the working set (e.g., the filtered data set) may be computed as the logical conjunction (AND) of the constituent result or data sets from each of the trees. Furthermore, this may be done in parallel. One disadvantage to this approach is that there is a possibility that empty working sets may be created.

In the cascading approach, the trees work in series. The order of the series may correspond to an order in which they are presented to a user. A selection in a first tree may be used to produce a constituent result or data set from filtering the data set. That constituent result set may be used to rebuild each of the subsequent trees (e.g., the second tree through the nth tree). These subsequent trees may have an "All" node as the root, but they may be significantly reduced or simpler compared to their independent (approach) counterparts because they are built to represent a reduced data set. This procedure may continue (e.g., repeat) with a selection in the second tree causing the third tree through the nth tree to be rebuilt to reflect the progressively eroded data set. One advantage to this approach is that the filters are dynamic and may help guide the user to successive and successful further filtering of the data (where "successful" implies non-empty working sets, for example). One disadvantage to this approach is that the computational burden is relatively high. In cases where the underlying data set is not in memory (e.g., in Random Access Memory (RAM)), the time to compute the dynamic trees may be long, causing a user interface to be insufficiently responsive to user inputs.

The systems and methods disclosed herein may provide an effective yet easy-to-use mechanism for filtering large data sets comprised of multivariate data. One example of a system where the systems and methods disclosed herein are not used is a web site that employs a single tree-like structure for filtering data sets comprised of artwork. Because a single tree is used, the tree can often become large and unwieldy, requiring multiple deep and exploratory traversals in order to narrow the data set to the desired working set.

It should be noted that compound and/or complex "select" statements applied to a database may yield similar filtration of such large and multivariate data sets. However, the process of creating and applying query statements requires a level of expertise which exceeds the skills of many users. Nevertheless, the systems and methods disclosed herein may make such filtering operations approachable to users with less expertise, since they may leverage a user's existing knowledge of navigating trees, and since the systems and methods disclosed herein may employ relatively few and shallow traversals of trees.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a computing device 102 in which systems and methods for filtering a data set may be implemented. Examples of the computing device 102 may include desktop computers, laptop computers, servers, supercomputers, smartphones, tablet devices, game consoles, e-readers and/or other devices that include memory and a processor. The computing device 102 may include (and/or obtain or generate) a data set 104, an optional partitioning block/module 108, a filtering block/module 114, a working data set 126, an input device 128 and/or an output device 130. As used herein, a "block/module" may be implemented in hardware, software or a combination of both. For example, the filtering block/module 114 may be implemented in hardware, software or a combination of hardware and software.

The input device 128 may be used to receive input from another device and/or from a user of the computing device 102. Examples of the input device 128 include mice, keyboards, controllers, touchscreens, microphones, cameras, network cards, Universal Serial Bus (USB) ports, infrared ports, wireless receivers, etc. The input device 128 may comprise multiple devices, blocks and/or modules that the computing device 102 may use to receive information. For instance, an input device 128 may be an Ethernet card that can receive information from another computing device connected to a network. In another example, the input device 128 may be a computer mouse that may be used by the computing device 102 to detect user interaction such as a "click" on an icon and/or translation of a cursor.

The output device 130 may be used to output, transmit, send, display, project, emit, and/or convey information to another device and/or to a user of the computing device 102. Examples of the output device 130 include displays, projectors, speakers, tactile devices, network cards, wireless transmitters, infrared transmitters, lights, etc. For instance, the output device 130 may be a monitor that can display information (e.g., images) to a user. In another example, the output device 130 may be a network card that can transmit information to another computing device connected to a network. In some configurations, the output device 130 may display a graphical user interface (GUI) to facilitate user interaction. For example, the computing device 102 may display a window with icons that a user may interact with using a keyboard and/or mouse (e.g., "keyboard/mouse").

The data set 104 may comprise a set of information or data that is available to the computing device 102. In one configuration, the computing device 102 may store the data set 104 in memory (e.g., on a hard drive and/or in Random Access Memory (RAM), etc.). Additionally or alternatively, the data set 104 may be accessible to the computing device 102 from another device, such as a thumb drive (e.g., USB drive), network storage device, external hard drive, optical drive (e.g., Compact Disc (CD) drive, Digital Video Disc (DVD) drive, Blu-ray drive, etc.) and/or other input device 128. For example, the data set 104 and/or one or more elements 106 of the data set 104 may be received from one or more computing devices (using a network, for example), from an external media port and/or may be received as manually entered on a keyboard/mouse by a user. In some configurations, the data set 104 may include data from varying kinds of objects, object attributes and/or one or more database tables used to store varying kinds of information. In one example, the data set 104 is an instance of a "DataSet" class provided by the Microsoft .Net framework. In other examples, the data set 104 may comprise one or more instances of databases, blobs, tables, records, collections, etc.

The data set 104 may include one or more elements 106. An element 106 may be information and/or an information structure. For example, an element 106 may be an object, an object attribute, a field, a property, an attribute, a value, a (table and/or database) row, a (table and/or database) column, a (table and/or database) cell, a table, a node, a (graph) vertex, some other kind of information and/or some other kind of information structure (e.g., graph, table, tree, list, etc.) or component thereof. In one configuration, the data set 104 includes elements 106 from multiple database tables that have been joined in the data set 104. In some configurations, the one or more elements 106 may comprise one or more data types such as strings, integers (int), floating-point numbers (float), double-precision floating-point numbers (double), "long" integers (long), characters (char), Boolean values (bool), etc.

The computing device 102 may optionally provide the data set 104 to an optional partitioning block/module 108. The partitioning block/module 108 may partition, divide, separate and/or group the data set 104 into one or more subsets 110. Each subset 110 may contain one or more elements 112 from the data set 104 elements 106. In one configuration, each subset 110 exclusively includes one or more elements 112 from the data set 104 elements 106. In that case, each data set 104 element 106 may be included in at most one subset 110 (as a subset 110 element 112). In some configurations, the subsets 110 may be formed based on input from an input device 128. For example, a user may specify (using a keyboard/mouse, for example) subsets 110 or groupings of elements 112 from data set 104 elements 106. The data set 104 may be provided to the filtering block/module 114. Additionally or alternatively, one or more subsets 110 may be provided to the filtering block/module 114.

The filtering block/module 114 may filter the data set 104 to produce a working data set 126. The working data set 126 may include the entire data set 104, a reduced portion (e.g., subset) of the data set 104 or none of the data set 104. For example, the working data set 126 may be an empty set in some cases. The filtering block/module 114 may include multiple trees 116. Each tree 116 may be a data structure that optionally includes a root node 118 and one or more nodes 120. For example, a tree 116 may be a "forest" of trees 116. A root node 118 may be optionally added to a "forest" to convert the forest into a tree 116 topology. The root node 118 may correspond to and/or represent all of the elements 106 in the data set 104. Each node 120 may correspond to and/or represent one or more elements 106 of the data set 104. The root node 118 and the one or more nodes 120 may be hierarchically organized. For example, the root node 118 may be at the top of the hierarchy, having one or more "child" nodes 120. The one or more nodes 120 may have zero, one or more child nodes 120. In one configuration, a node 120 may correspond to and/or represent multiple elements 106. In one configuration, a node 120 may allow multiple elements 106 to pass its component filter if at least one of the elements 106 corresponds to the node 120 and/or a descendant node 120 of the node 120.

One example is given hereafter for understanding. In this example, a "red" node 120 may correspond to an attribute of color, and this may represent elements 106 such as a red Ferrari and red Schwinn bicycle. Further, a "colored" root node 118 may be used, under which the previously described "red" node 120 and a "blue" node 120 may reside. Further, nodes 120 ("red" and "blue") may be leaf nodes or interior (e.g., non-root, non-leaf) nodes in a tree 116. In one configuration, the "red" node 120 may correspond to multiple elements 106 (e.g., red Ferrari and red Schwinn bike).

The root node 118 and/or one or more nodes 120 in each tree 116 may be used as a filter for the data set 104. For example, the root node 118 and one or more nodes 120 may each represent and/or be used to generate a component filter. More specifically, the root node 118 may represent a component filter that allows all of the elements 106 in the data set 104 (if not filtered by another tree 116, for example). Each node 120 may allow a corresponding data set 104 element 106 and any data set 104 elements 106 corresponding to its descendant nodes 120 to pass into the working data set 126 (if not filtered by another tree 116, for example). In some configurations, the filtering block/module 114 may provide information to the output device 130 for display and/or transmission, such as information representing one or more trees 116, nodes (e.g., root node(s) 118, node(s) 120, selected node(s) 124) and/or one or more constituent data sets (where a constituent data set is the result of filtering the data set 104 by one or more component filters based on one or more selected nodes 124, for example).

The multiple trees 116 may be used to form a composite filter 122. The composite filter 122 may include multiple selected nodes 124. Each selected node 124 may be a root node 118 or node 120 from a tree 116. The selected nodes 124 may be selected by default and/or based on an input from the input device 128. For instance, the computing device 102 may initially set all of the root nodes 118 as selected by default. Additionally or alternatively, the computing device 102 may select one or more root nodes 118 and/or one or more nodes 120 based on an input from the input device 128. In one configuration, the computing device 102 selects one or more root nodes 118 and/or one or more nodes 120 based on input from a user, such as a mouse click on an icon displayed on a graphical user interface (GUI).

Multiple selected nodes 124 (corresponding to multiple trees 116) may be used to generate the composite filter 122. The composite filter 122 may be a combination of component filters that are based on the selected nodes 124. The composite filter 122 may only allow elements 106 into the working set 126 as permitted by the combination of the selected nodes 124. For instance, this may allow elements 106 corresponding to each of the selected nodes 124 and their descendant nodes (unless filtered out by another selected node 124). In one configuration, for example, the selected nodes 124 may be used to form a database query. This database query may be used to retrieve one or more elements 106 from the data set 104 to produce the working data set 126 (in the case where the working data set 126 is not empty, for example).

The working data set 126 may be provided to the output device 130. In one configuration, the working data set 126 (or images based on the working data set 126) may be displayed on the output device 130. For example, the computing device 102 may output elements 106 from the data set 104 and/or information related to the elements 106 in the working data set 126 (that were not filtered out). In other configurations, the working data set 126 may additionally or alternatively be transmitted to another computing device (using a network, for example), stored on the computing device 102 and/or stored on removable media, etc.

In one configuration, the systems and methods disclosed herein may be used as follows. Frequently, users will traverse a tree 116 in one panel of a Graphical User Interface (GUI) on a display (e.g., output device 130) to make a selection that is more specific than a root node 118 (e.g., "All Products"). The resulting data set (e.g., working data set 126 or constituent data set, etc.) may then still have more items than desired. Thus, the user may make a sequence of progressively more specific selections in a second panel (and second tree 116) in the GUI until a desired resulting data set (e.g., working data set 126 or constituent data set, etc.) appears. This may be an interactive procedure in which the user will narrow the data set 104 (through successively more specific selections in one or more trees 116, for example) until the user finds what is sought in the resulting data set (e.g., working data set 126 or constituent data set, etc.).

In some cases, the user may have different goals, such as finding something in a data set 104, where it does not matter if there are additional things in the resulting data set (e.g., working data set 126 or constituent data set, etc.), so long as it contains what he is looking for. Alternatively, the user may have a goal of finding a resulting data set (e.g., working data set 126 or constituent data set, etc.) that shows exactly (only) the item(s) he is looking for. In one configuration, the output device 130 may display a GUI with one view (e.g., perspective) in which there are two panels ("Products" and "Computers"), where the selected nodes (e.g., one or more root nodes 118 and/or one or more nodes 120) with corresponding trees 116 in those panels governing (e.g., filtering) the resulting data set (e.g., product usage records) shown in a window below.

Thus, for instance, a user may traverse in one tree 116 from "All Products" to "Monitored" to "Adobe," and in another tree 116 the user may traverse from "All Computers" to "Engineering Computers." This may filter product usage records (e.g., one per software product per computer) to just those records pertaining to monitored Adobe products installed on engineering computers, the data set 104 being filtered by selections in trees 116 of attributes.

In another perspective or view, the computing device 102 may show trees/panels "Computers" and "Products" (e.g., a different left-to-right ordering). In yet another perspective or view, the computing device 102 may show trees/panels "Licenses" and "Computers," with each pair of trees/panels governing (e.g., filtering) a resultant data set (e.g., working data set 126 or constituent data set, etc.) shown in a window below these trees/panels. This concept may be generalized to any number (e.g., N) trees 116.

Figure 2:
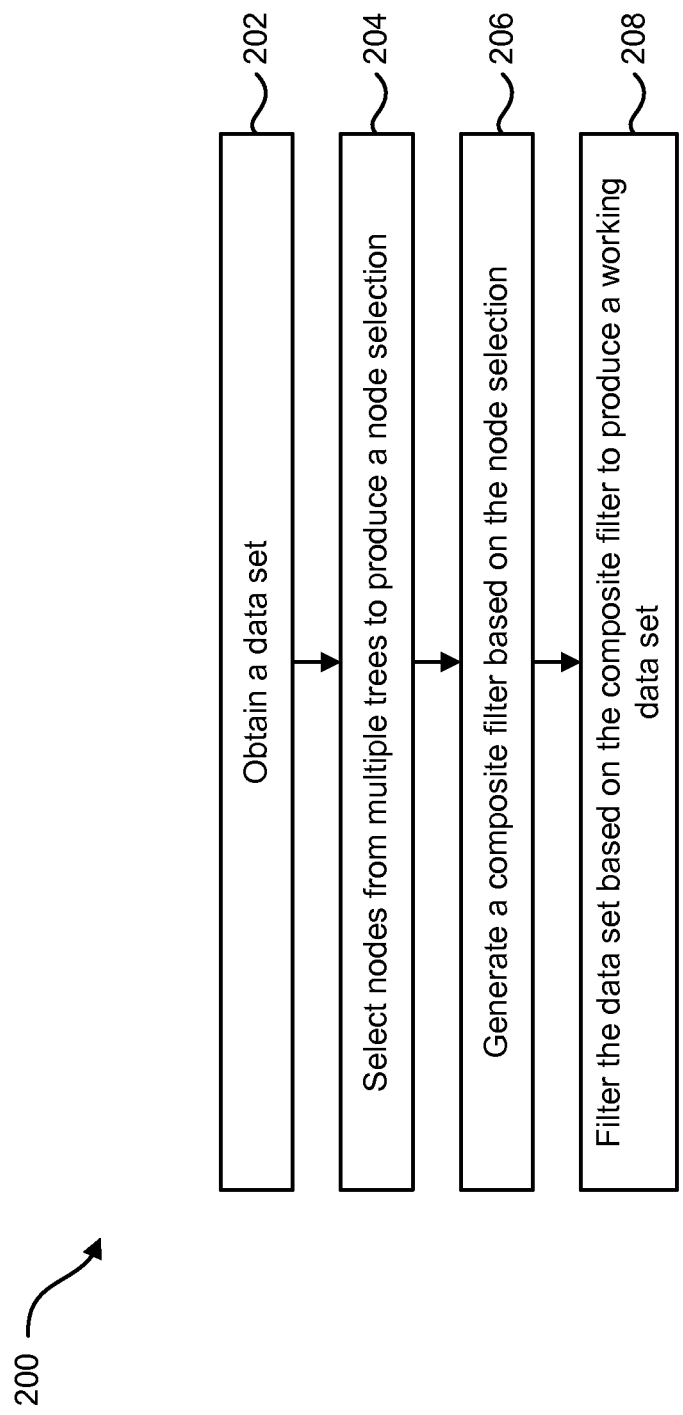
FIG. 2 is a flow diagram illustrating one configuration of a method for filtering a data set on a computing device.

FIG. 2 is a flow diagram illustrating one configuration of a method 200 for filtering a data set 104 on a computing device 102. A computing device 102 may obtain 202 a data set 104. For example, the computing device 102 may store the data set 104 in memory (e.g., on a hard drive and/or in Random Access Memory (RAM), etc.). Additionally or alternatively, the data set 104 may be accessible to the computing device 102 from another device, such as a thumb drive (e.g., USB drive), network storage device, external hard drive, optical drive (e.g., Compact Disc (CD) drive, Digital Video Disc (DVD) drive, Blu-ray drive, etc.) and/or other input device 128. For example, the data set 104 and/or one or more elements 106 of the data set 104 may be received from one or more computing devices (using a network, for example), from an external media port and/or may be received as manually entered on a keyboard/mouse by a user. In some configurations, the data set 104 may include data from varying kinds of objects, object attributes and/or one or more database tables used to store varying kinds of information.

The computing device 102 may select 204 nodes (e.g., one or more root nodes 118 and/or one or more nodes 120) to produce a node selection. This node selection may comprise the selected nodes 124 described in connection with FIG. 1, for instance. The computing device 102 may select 204 the nodes automatically and/or based on received input. For example, the computing device 102 may initially select 204 the root nodes 118 from each tree 116 by default. Continuing the example, the computing device 102 may then select 204 one or more root nodes 118 and/or nodes 120 based on received input (e.g., user input, input from another computing device, etc.). For example, a user may indicate one or more root nodes 118 and/or nodes 120 for selection 204 using a GUI and a keyboard/mouse. The computing device 102 may accordingly modify (e.g., add to, change, etc.) the node selection.

The computing device 102 may generate 206 a composite filter 122 based on the node selection. For example, the composite filter 122 may include instructions and/or data useable by the computing device 102 to filter the data set 104 as specified by the node selection. In one configuration, the computing device 102 generates a database query based on the node selection. For instance, each selected node 124 may indicate or specify one or more tables, key values, indices, values, columns, rows, cells, search terms and/or other information that will allow an element 106 corresponding to the selected node 124 and/or one or more elements 106 corresponding to one or more descendant nodes to pass into the working data set 126. This may be combined with other information provided by other selected nodes 124 to produce a composite database query (e.g., composite filter 122). In some configurations, this composite filter 122 may specify the logical conjunction (e.g., "AND") of one or more data set 104 elements 106.

The computing device 102 may filter 208 the data set 104 based on the composite filter 122 to produce a working data set 126. For example, the computing device 102 may retrieve only those elements 106 (if any) from the data set 104 that are allowed to pass through the composite filter 122. In one configuration, the computing device 102 may query a database (e.g., the data set 104) and retrieve one or more elements 106 (if any) as specified by the composite filter 122. One or more elements 106 from the data set 104 that pass through the composite filter 122 (if any) may be used to form the working data set 126. The working data set 126 may be arranged according to some structure. For example, the elements 106 resulting from the filtering operation (if any) may be placed in a table, list, tree, array, graph and/or some other structure.

Figure 3:
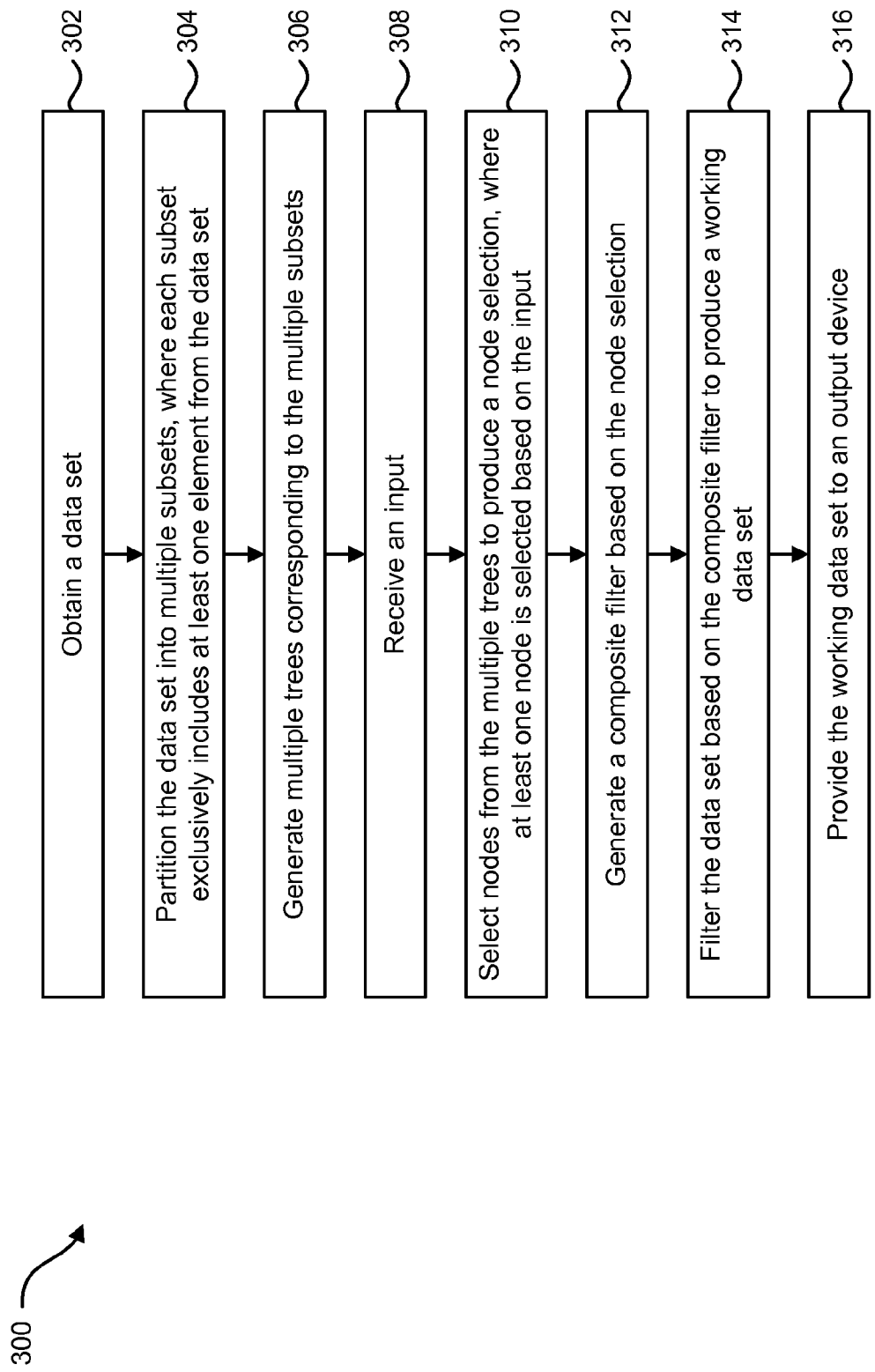
FIG. 3 is a flow diagram illustrating a more specific configuration of a method for filtering a data set on a computing device.

FIG. 3 is a flow diagram illustrating a more specific configuration of a method 300 for filtering a data set 104 on a computing device 102. A computing device 102 may obtain 302 a data set 104. For example, the computing device 102 may store the data set 104 in memory (e.g., on a hard drive and/or in Random Access Memory (RAM), etc.). Additionally or alternatively, the data set 104 may be accessible to the computing device 102 from another device, such as a thumb drive (e.g., USB drive), network storage device, external hard drive, optical drive (e.g., Compact Disc (CD) drive, Digital Video Disc (DVD) drive, Blu-ray drive, etc.) and/or other input device 128. For example, the data set 104 and/or one or more elements 106 of the data set 104 may be received from one or more computing devices (using a network, for example), from an external media port and/or may be received as manually entered on a keyboard/mouse by a user. In some configurations, the data set 104 may include data from varying kinds of objects, object attributes and/or one or more database tables used to store varying kinds of information.

The computing device 102 may partition 304 the data set 104 into multiple subsets 110, where each subset 110 exclusively includes at least one element 112 from the data set 104. In one configuration, the computing device 102 may partition 304 one or more elements 106 in the data set 104 into a subset 110 by designating a part of the data set 104 as a subset 110. This may be done, for example, using a memory address or range of memory addresses, a database key or range of keys, database component identifier(s) (e.g., row name(s), column name(s), cell name(s), index(es), table name(s), etc.), object name(s), attribute identifier(s), array/list index(es), etc.

In some configurations, the computing device 102 may partition 304 the data set 104 elements 106 into logical semantic groupings. For instance, assume that a data set 104 includes several attributes, including color, body style, brand, model, year, gender, age, rating, region and distance attributes. These attributes may be partitioned 304 into three subsets 110, including a subset 110 of attributes that apply to a car, another subset 110 of attributes that apply to a driver, and yet another subset 110 of attributes that apply to a commute. For example, the "car" subset 110 of attributes may include color, body style, brand, model and year attributes. The "driver" subset 110 of attributes may include gender, age and rating attributes. Furthermore, the "commute" subset 110 of attributes may include region and distance attributes.

In some configurations, the computing device 102 may partition 304 the data set 104 based on an input. For example, the computing device 102 may receive a command from a user or another computing device to designate one or more elements 106 within the data set 104 as a subset 110. Additionally or alternatively, the computing device 102 may receive data from a user or another computing device that names the subset 110.

The computing device 102 may generate 306 multiple trees 116 corresponding to the multiple subsets 110. The computing device 102 may generate 306 trees 116 by generating a root node 118 corresponding to each subset 110 and by generating one or more nodes 120 that correspond to each element 112 included in each subset 110. Returning to the example above, the computing device 102 may generate 306 a tree 116 for "car" attributes. For instance, assume that the data set 104 is a database with a table including color, body style, brand, model and year columns (amongst others). The computing device 102 may receive a command that identifies these columns as appropriate for inclusion in a "car" tree 116. In this case, the computing device 102 may generate a root node 118 for the "car" tree 116 and color, body style, brand, model and year child nodes 120. Furthermore, the computing device 102 may generate more child nodes 120 according to values included in the columns, such as red, green, blue, black, white, etc., nodes 120 that are child nodes 120 in relation to the color node 120. Additionally or alternatively, the computing device 102 may receive one or more commands (from a user, for example) that specify a hierarchy of nodes 120.

It should be noted that determining the hierarchy may be driven by an algorithm. The algorithm may optimize for a desired goal. For example, a hierarchy may be determined where the most distinguishing attributes (correspond to nodes 120 that) may be placed higher in the tree 116 (such that they are encountered first). Alternatively, the most recently used attributes (correspond to nodes 120 that) may be placed higher in the tree. The systems and methods disclosed herein may be used to determine the hierarchy in other ways. For example, a user input may specify which nodes 120 go at what level of the tree 116.

The computing device 102 may receive 308 an input. For example, the computing device 102 may receive a signal, message, command and/or data using an input device 128. This input may be received from another computing device and/or a user. The input may specify a root node 118 or node 120 in one of the trees 116 for selection. In one configuration, the computing device 102 displays a GUI using the output device 130 that presents one or more images (e.g., icons) representing one or more nodes (e.g., root node(s) 118 and/or node(s) 120) for selection. A user may click on one of these images using a mouse (e.g., input device 128), indicating a node (e.g., root node 118 or node 120) for selection.

The computing device 102 may select 310 nodes (e.g., one or more root nodes 118 and/or one or more nodes 120) to produce a node selection, where at least one node is selected based on the input. This node selection may comprise the selected nodes 124 described in connection with FIG. 1, for instance. The computing device 102 may select 310 the nodes automatically and/or based on received input. For example, the computing device 102 may initially select 310 the root nodes 118 from each tree 116 by default. The computing device 102 may then select 310 one or more root nodes 118 and/or nodes 120 based on received input (e.g., user input, input from another computing device, etc.). For example, a user may indicate one or more root nodes 118 and/or nodes 120 for selection 310 using a GUI and a keyboard/mouse. The computing device 102 may accordingly modify (e.g., add to, change, etc.) the node selection. For example, if a received input indicates a different node (e.g., root node 118 or node 120) than the node currently selected for a tree 116, the computing device 102 may replace the currently selected node from the node selection with the different node indicated. In another configuration, the computing device 102 may not select any particular nodes by default before receiving an input that indicates one or more nodes (e.g., root node(s) 118 and/or node(s) 120).

The computing device 102 may generate 312 a composite filter 122 based on the node selection. For example, the composite filter 122 may include instructions and/or data useable by the computing device 102 to filter the data set 104 as specified by the node selection. In one configuration, the computing device 102 generates a database query based on the node selection. For instance, each selected node 124 may indicate or specify one or more tables, key values, indices, values, columns, rows, cells, search terms and/or other information that will allow an element 106 corresponding to the selected node 124 and/or one or more elements 106 corresponding to one or more descendant nodes to pass into the working data set 126. This may be combined with other information provided by other selected nodes 124 to produce a composite database query (e.g., composite filter 122). In some configurations, this composite filter 122 may specify the logical conjunction (e.g., "AND") of one or more data set 104 elements 106.

The computing device 102 may filter 314 the data set 104 based on the composite filter 122 to produce a working data set 126. For example, the computing device 102 may retrieve only those elements 106 (if any) from the data set 104 that are allowed to pass through the composite filter 122. In one configuration, the computing device 102 may query a database (e.g., the data set 104) and retrieve one or more elements 106 (if any) as specified by the composite filter 122. One or more elements 106 from the data set 104 that pass through the composite filter 122 (if any) may be used to form the working data set 126. The working data set 126 may be arranged according to some structure. For example, the elements 106 resulting from the filtering operation (if any) may be placed in a table, list, tree, array, graph and/or some other structure.

The computing device 102 may provide 316 the working data set 126 to an output device 130. For example, the computing device 102 may provide 316 the working data set 126 (e.g., information related to the working data set 126, an image of the working data set 126, etc.) to a display device. In that case, the computing device 102 may display the working data set 126 using a monitor, screen, projector or other image display technology. Additionally or alternatively, the computing device 102 may provide 316 the working data set 126 to an output device 130 for transmission to another electronic device. For instance, the working data set 126 may be provided 316 to a network card for transmission to another computing device on a network.

Figure 4:
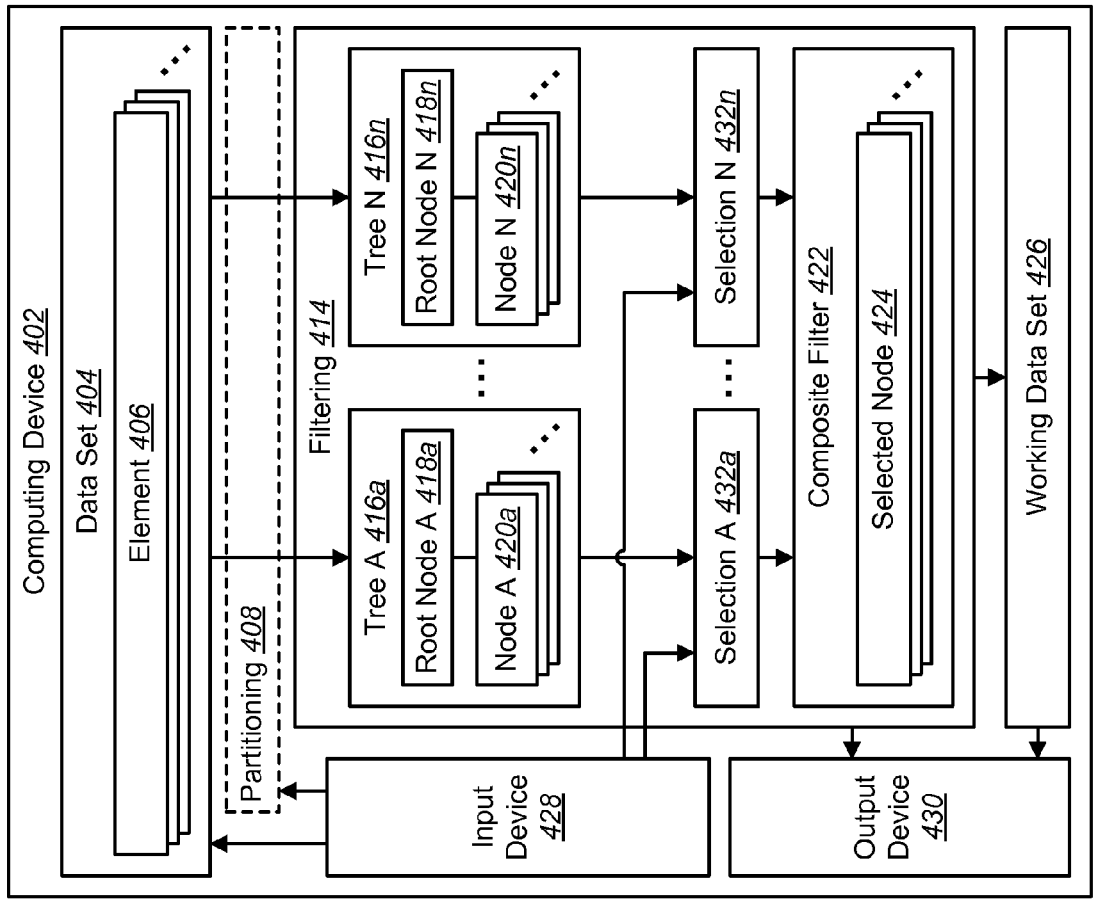
FIG. 4 is a block diagram illustrating a more specific configuration of a computing device in which systems and methods for filtering a data set may be implemented.

FIG. 4 is a block diagram illustrating a more specific configuration of a computing device 402 in which systems and methods for filtering a data set 404 may be implemented. The computing device 402 illustrated in FIG. 4 may be configured similarly to the computing device 102 illustrated in FIG. 1. The computing device 402 may include (and/or obtain or generate) a data set 404, an optional partitioning block/module 408, a filtering block/module 414, a working data set 426, an input device 428 and/or an output device 430 similar to corresponding components 104, 108, 114, 126, 128, 130 described above in connection with FIG. 1.

The input device 428 may be used to receive input from another device and/or from a user of the computing device 402. The input device 428 may comprise multiple devices, blocks and/or modules that the computing device 402 may use to receive information.

The output device 430 may be used to output, transmit, send, display, project, emit, and/or convey information to another device and/or to a user of the computing device 402. In some configurations, the output device 430 may display a graphical user interface (GUI) to facilitate user interaction. For example, the computing device 402 may display a window with icons that a user may interact with using a keyboard and/or mouse (e.g., "keyboard/mouse").

The data set 404 may comprise a set of information or data that is available to the computing device 402. In one configuration, the computing device 402 may store the data set 404 in memory (e.g., on a hard drive and/or in Random Access Memory (RAM), etc.). Additionally or alternatively, the data set 404 may be accessible to the computing device 402 from another device, such as a thumb drive (e.g., USB drive), network storage device, external hard drive, optical drive (e.g., Compact Disc (CD) drive, Digital Video Disc (DVD) drive, Blu-ray drive, etc.) and/or other input device 428. For example, the data set 404 and/or one or more elements 406 of the data set 404 may be received from one or more computing devices (using a network, for example), from an external media port and/or may be received as manually entered on a keyboard/mouse by a user. In some configurations, the data set 404 may include data from varying kinds of objects, object attributes and/or one or more database tables used to store varying kinds of information.

The data set 404 may include one or more elements 406. An element 406 may be information and/or an information structure. For example, an element 406 may be an object, an object attribute, a field, a property, an attribute, a value, a row (of a table and/or database, for example), a column, a cell, a table, a node, a (graph) vertex, some other kind of information and/or some other kind of information structure (e.g., graph, table, tree, list, etc.) or component thereof. In one configuration, the data set 404 includes elements 406 from multiple database tables that have been joined in the data set 404. In some configurations, the one or more elements 406 may comprise one or more data types such as strings, integers (int), floating-point numbers (float), double-precision floating-point numbers (double), "long" integers (long), characters (char), Boolean values (bool), etc.

The computing device 402 may optionally provide the data set 404 to an optional partitioning block/module 408. The partitioning block/module 408 may partition, divide, separate and/or group the data set 404 into one or more subsets. Each subset may contain one or more elements from the data set 404 elements 406. In one configuration, each subset exclusively includes one or more elements from the data set 404 elements 406. In that case, each data set 404 element 406 may be included in at most one subset (as a subset element). In some configurations, the subsets may be formed based on input from an input device 428. For example, a user may specify (using a keyboard/mouse, for example) subsets or groupings of elements 406 from the data set 404. The data set 404 may be provided to the filtering block/module 414. Additionally or alternatively, one or more subsets may be provided to the filtering block/module 414.

The filtering block/module 414 may filter the data set 404 to produce a working data set 426. The working data set 426 may include the entire data set 404, a reduced portion (e.g., subset) of the data set 404 or none of the data set 404. The filtering block/module 414 may include multiple trees 416a-n. Each tree 416a-n may be a data structure including a root node 418 and one or more nodes 420. More specifically, tree A 416a including root node A 418a and one or more nodes A 420a through tree N 416n including root node N 418n and one or more nodes N 420n may be included in the filtering block/ module 414. A root node 418 may correspond to and/or represent all of the elements 406 in the data set 404. Each node 420 may correspond to and/or represent one or more elements 406 of the data set 404. Each root node 418a-n and the corresponding one or more nodes 420a-n in each tree 416a-n may be hierarchically organized. For example, each root node 418a-n may be at the top of a hierarchy in its respective tree 416a-n, each having one or more "child" nodes 420a-n, respectively. Each node 420 may have zero, one or more child nodes 420.

The root node 418 and/or one or more nodes 420 in each tree 416 may be used as a filter for the data set 404. For example, the root node 418 and one or more nodes 420 may each represent and/or be used to generate a component filter. More specifically, each root node 418 may allow all of the elements 406 in the data set 404 to pass into the working data set 426 (if not filtered by another tree 416, for example). Each node 420 may allow a corresponding data set 404 element 406 and any data set 404 elements 406 corresponding to its descendant nodes 420 to pass into the working data set 426 (if not filtered by another tree 416, for example).

The multiple trees 416a-n may be used to form a composite filter 422. The composite filter 422 may include multiple selected nodes 424. Each selected node 424 may be a root node 418 or node 420 from a tree 416. The selected nodes 424 may be selected by default and/or based on an input from the input device 428. For instance, the computing device 402 may select all of the root nodes 418a-n by default. Additionally or alternatively, the computing device 402 may select one or more root nodes 418 and/or one or more nodes 420 based on an input from the input device 428. In one configuration, the computing device 402 selects one or more root nodes 418 and/or one or more nodes 420 based on input from a user, such as a mouse click on an icon displayed on a graphical user interface (GUI).

In FIG. 4, the filtering block/module 414 is illustrated as including multiple selection blocks/modules 432a-n. It should be noted that the multiple selection blocks/modules 432a-n may be implemented as a single block/module or as multiple blocks/modules. The computing device 402 may use each selection block/module 432a-n to select a node (e.g., a root node 418 or node 420) from each of the trees 416a-n. One or more of the selection blocks/modules 432a-n may select a node (e.g., a root node 418 or node 420) based on an input from an input device 428 (originating from a user, for example). For instance, selection block/module A 432a may select a node (e.g., a root node 418 or one of the nodes A 420a) based on an input from the input device 428. Other additional selection blocks/modules 432 may optionally select a node (e.g., a root node 418 or node 420) from a corresponding tree 416 based on an input from the input device 428.

As illustrated in FIG. 4, the computing device 402 may use the selection blocks/modules 432a in an independent configuration. In this configuration, each tree 416a-n works in isolation from one another. For example, a selection in tree A 416a (by selection block/module A 432a) does not affect the structure or contents of any trees 416 besides tree A 416a. One advantage of this configuration is that the computational burden may be relatively light. For instance, other trees 416 do not need to be recomputed (e.g., regenerated) and the working set 426 may be computed as the logical conjunction (e.g., "AND") of the constituent result sets from each of the trees 416a-n. Furthermore, this may be done in parallel. One disadvantage to this configuration may be that there is a possibility that an empty working set 426 may be created. In general, it should be noted that a "constituent set," "constituent data set," "constituent result set" or other variations as used herein may be the result of filtering a data set (e.g., data set 104) using one or more selected nodes (e.g., root node(s) 118 and/or node(s) 120). Thus, a constituent set may include all of a data set, a subset of a data set or none of a data set. It should be noted that one or more constituent data sets (e.g., information representing one or more constituent data sets) may be provided to the output device 430 for display and/or transmission.

Multiple selected nodes 424 (corresponding to multiple trees 416a-n) may be used to generate the composite filter 422. The composite filter 422 may be a combination of component filters that are based on the selected nodes 424. The composite filter 422 may only allow elements 406 into the working set 426 as permitted by the combination of the selected nodes 424. For instance, this may allow elements corresponding to each of the selected nodes 424 and their descendant nodes (unless filtered out by another selected node 424). In one configuration, for example, the selected nodes 424 may be used to form a database query. This database query may be used to retrieve one or more elements 460 from the data set 404 to produce the working data set 426.

The working data set 426 may be provided to the output device 430. In one configuration, the working data set 426 (or information representing the working data set 426, images based on the working data set 426, etc.) may be displayed on the output device 430. For example, the computing device 402 may output elements 406 from the data set 404 and/or information related to the elements 406 in the working data set 426 (that were not filtered out). In other configurations, the working data set 426 may additionally or alternatively be transmitted to another computing device (using a network, for example), stored on the computing device 402 and/or stored on removable media, etc.

Figure 5:
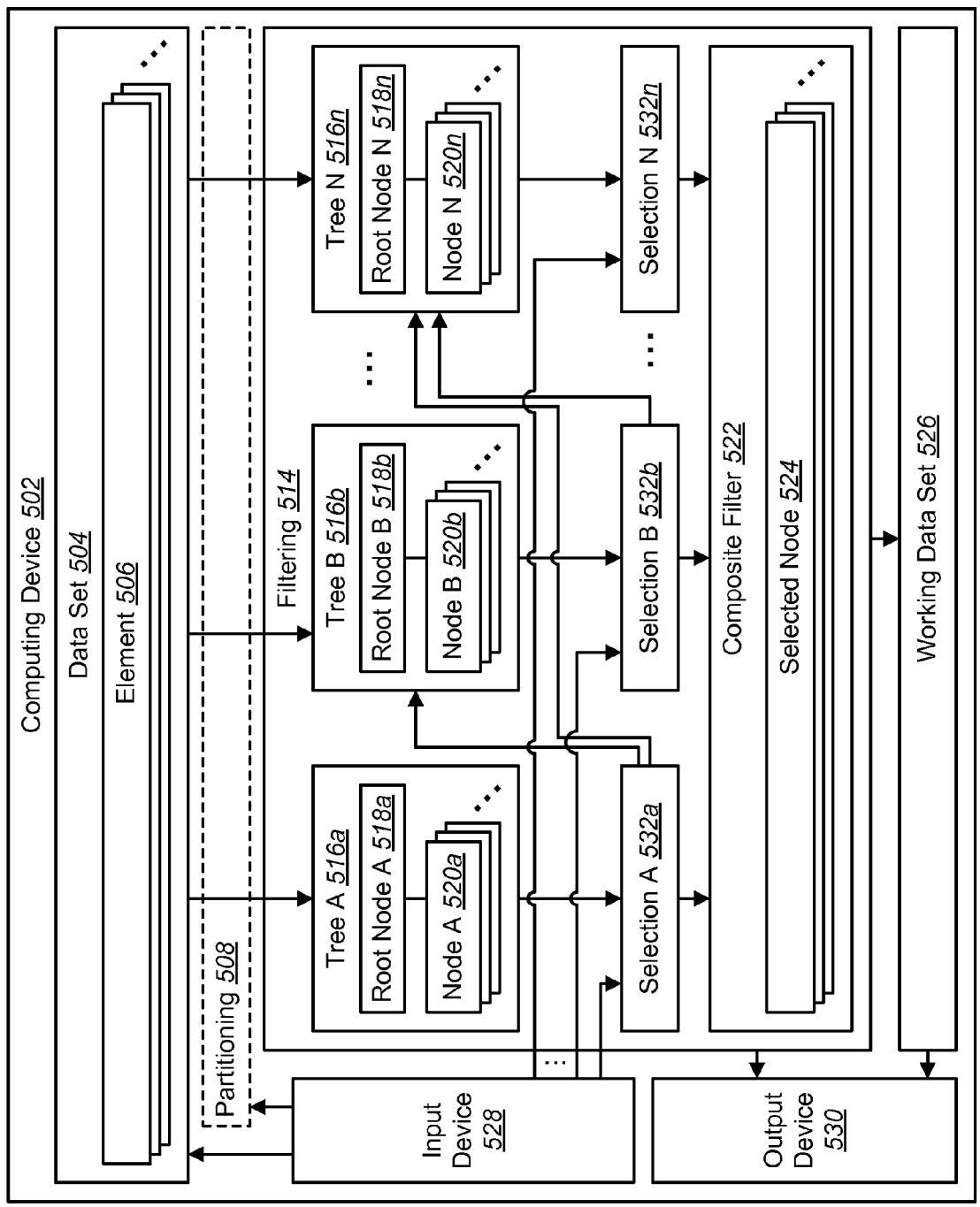
FIG. 5 is a block diagram illustrating another more specific configuration of a computing device in which systems and methods for filtering a data set may be implemented.

FIG. 5 is a block diagram illustrating another more specific configuration of a computing device 502 in which systems and methods for filtering a data set 504 may be implemented. The computing device 502 illustrated in FIG. 5 may be configured similarly to the computing device 102 illustrated in FIG. 1. The computing device 502 may include (and/or obtain or generate) a data set 504, an optional partitioning block/module 508, a filtering block/module 514, a working data set 526, an input device 528 and/or an output device 530 similar to corresponding components 104, 108, 114, 126, 128, 130 described above in connection with FIG. 1.

The input device 528 may be used to receive input from another device and/or from a user of the computing device 502. The input device 528 may comprise multiple devices, blocks and/or modules that the computing device 502 may use to receive information.

The output device 530 may be used to output, transmit, send, display, project, emit, and/or convey information to another device and/or to a user of the computing device 502. In some configurations, the output device 530 may display a graphical user interface (GUI) to facilitate user interaction. For example, the computing device 502 may display a window with icons that a user may interact with using a keyboard and/or mouse (e.g., "keyboard/mouse").

The data set 504 may comprise a set of information or data that is available to the computing device 502. In one configuration, the computing device 502 may store the data set 504 in memory (e.g., on a hard drive and/or in Random Access Memory (RAM), etc.). Additionally or alternatively, the data set 504 may be accessible to the computing device 502 from another device, such as a thumb drive (e.g., USB drive), network storage device, external hard drive, optical drive (e.g., Compact Disc (CD) drive, Digital Video Disc (DVD) drive, Blu-ray drive, etc.) and/or other input device 528. For example, the data set 504 and/or one or more elements 506 of the data set 504 may be received from one or more computing devices (using a network, for example), from an external media port and/or may be received as manually entered on a keyboard/mouse by a user. In some configurations, the data set 504 may include data from varying kinds of objects, object attributes and/or one or more database tables used to store varying kinds of information.

The data set 504 may include one or more elements 506. An element 506 may be information and/or an information structure. For example, an element 506 may be an object, an object attribute, a field, a property, an attribute, a value, a row (of a table and/or database, for example), a column, a cell, a table, a node, a (graph) vertex, some other kind of information and/or some other kind of information structure (e.g., graph, table, tree, list, etc.) or component thereof. In one configuration, the data set 504 includes elements 506 from multiple database tables that have been joined in the data set 504. In some configurations, the one or more elements 506 may comprise one or more data types such as strings, integers (int), floating-point numbers (float), double-precision floating-point numbers (double), "long" integers (long), characters (char), Boolean values (bool), etc.

The computing device 502 may optionally provide the data set 504 to an optional partitioning block/module 508. The partitioning block/module 508 may partition, divide, separate and/or group the data set 504 into one or more subsets. Each subset may contain one or more elements from the data set 504 elements 506. In one configuration, each subset exclusively includes one or more elements from the data set 504 elements 506. In that case, each data set 504 element 506 may be included in at most one subset (as a subset element). In some configurations, the subsets may be formed based on input from an input device 528. For example, a user may specify (using a keyboard/mouse, for example) subsets or groupings of elements 506 from the data set 504. The data set 504 may be provided to the filtering block/module 514. Additionally or alternatively, one or more subsets may be provided to the filtering block/module 514.

The filtering block/module 514 may filter the data set 504 to produce a working data set 526. The working data set 526 may include the entire data set 504 or less than (e.g., a subset) the entire data set 504. The filtering block/module 514 may include multiple trees 516a-n. Each tree 516a-n may be a data structure including a root node 518 and one or more nodes 520. More specifically, tree A 516a including root node A 518a and one or more nodes A 520a and tree B 516b including root node B 518b and one or more nodes B 520b through tree N 516n including root node N 518n and one or more nodes N 520n may be included in the filtering block/module 514. A root node 518 may correspond to and/or represent all of the elements 506 in the data set 504. Each node 520 may correspond to and/or represent one or more elements 506 of the data set 504. Each root node 518a-n and the corresponding one or more nodes 520a-n in each tree 516a-n may be hierarchically organized. For example, each root node 518a-n may be at the top of a hierarchy in its respective tree 516a-n, each having one or more "child" nodes 520a-n, respectively. Each node 520 may have zero, one or more child nodes 520.

The root node 518 and/or one or more nodes 520 in each tree 516 may be used as a filter for the data set 504. For example, the root node 518 and one or more nodes 520 may each represent and/or be used to generate a component filter. More specifically, each root node 518 may allow all of the elements 506 in the data set to pass into the working data set 526 (if not filtered by another tree 516, for example). Each node 520 may allow a corresponding data set 504 element 506 and any data set 504 elements 506 corresponding to its descendant nodes 520 to pass into the working data set 526 (if not filtered by another tree 516, for example).

The multiple trees 516a-n may be used to form a composite filter 522. The composite filter 522 may include multiple selected nodes 524. Each selected node 524 may be a root node 518 or node 520 from a tree 516. The selected nodes 524 may be selected by default and/or based on an input from the input device 528. For instance, the computing device 502 may select all of the root nodes 518a-n by default. Additionally or alternatively, the computing device 502 may select one or more root nodes 518 and/or one or more nodes 520 based on an input from the input device 528. In one configuration, the computing device 502 selects one or more root nodes 518 and/or one or more nodes 520 based on input from a user, such as a mouse click on an icon displayed on a graphical user interface (GUI).

In FIG. 5, the filtering block/module 514 is illustrated as including multiple selection blocks/modules 532a-n. It should be noted that the multiple selection blocks/modules 532a-n may be implemented as a single block/module or as multiple blocks/modules. The computing device 502 may use each selection block/module 532a-n to select a node (e.g., a root node 518 or node 520) from each of the trees 516a-n. One or more of the selection blocks/modules 532a-n may select a node (e.g., a root node 518 or node 520) based on an input from an input device 528. For example, selection block/module A 532a may select a node (e.g., a root node 518 or one of the nodes A 520a) based on an input from the input device 528. Other additional selection blocks/modules 532 may optionally select a node (e.g., a root node 518 or node 520) from a corresponding tree 516 based on an input from the input device 528.

As illustrated in FIG. 5, the computing device 502 may use the selection blocks/modules 532a in a cascading configuration. In this configuration, the trees 516a-n may work in series. In some cases, the order of the series may correspond to an order in which the trees 516a-n are presented to a user. It should be noted, however, that the order may be arbitrarily determined in some configurations. For instance, a user may be provided with an option of which tree 516 to select from, where the sequence of selection determines the order of the series.

In one example of the cascading configuration, a selection in tree A 516a (by selection block/module A 532a) may be used to produce a constituent result set from filtering the data set 504. That constituent result set may be used to rebuild each of the subsequent trees (e.g., tree B 516b through tree N 516n). Additionally or alternatively, the constituent result set (e.g., information representing the constituent result set) may be provided to the output device 530 for display and/or transmission. Subsequent trees B-N 516b-n may each have an "all" root node 518b-n, but these trees 516b-n may be reduced or simpler compared to those in an independent configuration because they 516b-n are built to represent a reduced data set. This procedure may continue with a selection in tree B 516b (by selection block/module B 532b) causing a third tree 516 through tree N 516n to be rebuilt to reflect the progressively eroded data set. It should be noted that selecting a node 520 in a tree 516 may be based on input received form the input device 528.

One advantage to this approach is that the component filters are dynamic and may help guide the user to successive and successful further filtering of the data (where "successful" implies non-empty working sets, for example). One disadvantage to this approach is that the computational burden is relatively high. In cases where the underlying data set 504 is not in memory (e.g., in Random Access Memory (RAM)), the time to compute the dynamic trees 516 may be long, causing a user interface to be insufficiently responsive to user inputs.

Multiple selected nodes 524 (corresponding to multiple trees 516*a-n*) may be used to generate the composite filter 522. The composite filter 522 may be a combination of component filters that are based on the selected nodes 524. The composite filter 522 may only allow elements 506 into the working set 526 as permitted by the combination of the selected nodes 524. For instance, this may allow elements corresponding to each of the selected nodes 524 and their descendant nodes (unless filtered out by another selected node 524). In one configuration, for example, the selected nodes 524 may be used to form a database query. This database query may be used to retrieve one or more elements 560 from the data set 504 to produce the working data set 526.

The working data set 526 may be provided to the output device 530. In one configuration, the working data set 526 (or images based on the working data set 526) may be displayed on the output device 530. For example, the computing device 502 may output elements 506 from the data set 504 and/or information related to the elements 506 in the working data set 526 (that were not filtered out). In other configurations, the working data set 526 may additionally or alternatively be transmitted to another computing device (using a network, for example), stored on the computing device 502 and/or stored on removable media, etc.

Figure 6:
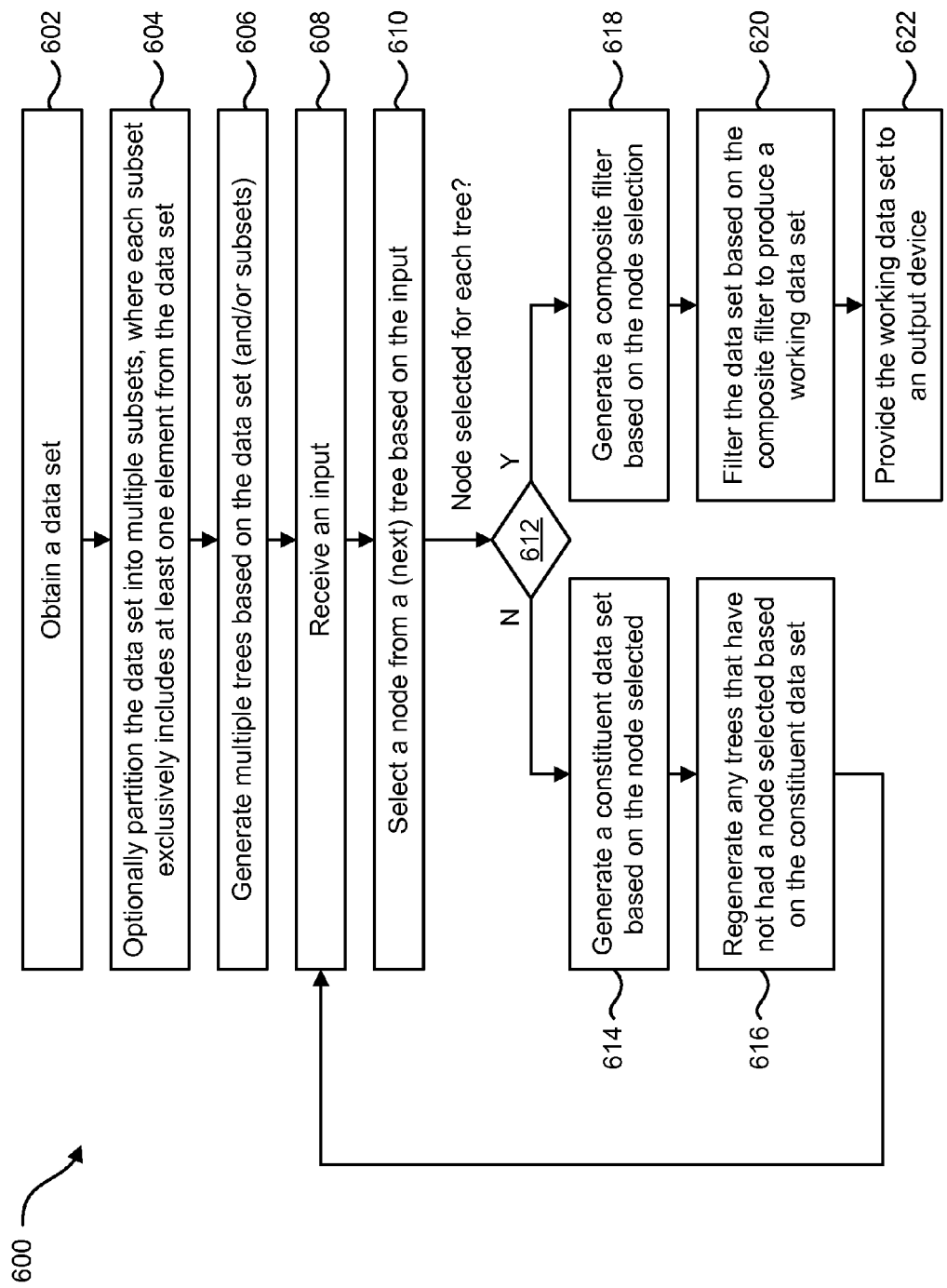
FIG. 6 is a flow diagram illustrating another more specific configuration of a method for filtering a data set on a computing device.

FIG. 6 is a flow diagram illustrating another more specific configuration of a method 600 for filtering a data set 504 on a computing device 502. A computing device 502 may obtain 602 a data set 504. For example, the computing device 502 may store the data set 504 in memory (e.g., on a hard drive and/or in Random Access Memory (RAM), etc.). Additionally or alternatively, the data set 504 may be accessible to the computing device 502 from another device, such as a thumb drive (e.g., USB drive), network storage device, external hard drive, optical drive (e.g., Compact Disc (CD) drive, Digital Video Disc (DVD) drive, Blu-ray drive, etc.) and/or other input device 528. For example, the data set 504 and/or one or more elements 506 of the data set 504 may be received from one or more computing devices (using a network, for example), from an external media port and/or may be received as manually entered on a keyboard/mouse by a user. In some configurations, the data set 504 may include data from varying kinds of objects, object attributes and/or one or more database tables used to store varying kinds of information.

The computing device 502 may optionally partition 604 the data set 504 into multiple subsets, where each subset exclusively includes at least one element from the data set 504. In one configuration, the computing device 502 may partition 604 one or more elements 506 in the data set 504 into a subset by designating a part of the data set 504 as a subset. This may be done, for example, using a memory address or range of memory addresses, a database key or range of keys, database component identifier(s) (e.g., row name(s), column name(s), cell name(s), index(es), table name(s), etc.), object name(s), attribute identifier(s), array/list index(es), etc.

In some configurations, the computing device 502 may partition 604 the data set 504 elements 506 into logical semantic groupings. For instance, assume that a data set 504 includes several attributes, including color, body style, brand, model, year, gender, age, rating, region and distance attributes. These attributes may be partitioned 604 into three subsets, including a subset of attributes that apply to a car, another subset of attributes that apply to a driver, and yet another subset of attributes that apply to a commute. For example, the "car" subset of attributes may include color, body style, brand, model and year attributes. The "driver" subset of attributes may include gender, age and rating attributes. Furthermore, the "commute" subset of attributes may include region and distance attributes.

In some configurations, the computing device 502 may partition 604 the data set 504 based on an input. For example, the computing device 502 may receive a command from a user or another computing device to designate one or more elements 506 within the data set 504 as a subset. Additionally or alternatively, the computing device 502 may receive data from a user or another computing device that names the subset.

The computing device 502 may generate 606 multiple trees 516 based on the data set 504 (and/or based on the multiple subsets). The computing device 502 may generate 606 each tree 516 by generating a root node 518 and one or more nodes 520 (each corresponding to a data set 504 element 506) for that tree 516. Optionally, each root node 518 may correspond to each subset and each of the one or more nodes 520 may correspond to each element included in each subset.

The computing device 502 may receive 608 an input. For example, the computing device 502 may receive a signal, message, command and/or data using an input device 528. This input may be received from another computing device and/or a user. The input may specify a root node 518 or node 520 in one of the trees 516 for selection. In one configuration, the computing device 502 displays a GUI using the output device 530 that presents one or more images (e.g., icons) representing one or more nodes (e.g., root node(s) 518 and/or node(s) 520) for selection. A user may click on one of these images using a mouse (e.g., input device 528), indicating a node (e.g., root node 518 or node 520) for selection.

The computing device 502 may select 610 a node (e.g., a root node 518 or node 520) from a tree 516 based on the input. If the computing device 502 has already selected 610 a node from a particular tree 516, the computing device 502 may select 610 a node from a "next" tree 516. The next tree in a sequence may be used in accordance with some predetermined order, according to a received input from the input device 528 (e.g., as arbitrarily chosen by a user) or in some other order. If no node has yet been selected, the computing device 502 may select 610 a node from a first tree 516. Selecting 610 a node may contribute to a node selection. For instance, selecting 610 a node may add a selected node 524 to the node selection. This node selection may comprise one or more selected nodes 524 as described in connection with FIG. 5, for instance.

The computing device 502 may determine 612 whether a node has been selected for each tree 516 (e.g., for all trees 516). For example, the computing device 502 may have multiple trees 516 (in a "filtering set"). If a node has not been selected for any of those trees 516, the computing device 502 may determine 612 that a node has not been selected for each tree 516. Otherwise, if a node has been selected for each tree 516, the computing device 502 may determine 612 that a node has been selected for each tree 516.

If a node has not been selected for each tree 516, the computing device 502 may generate 614 a constituent data set based on the node selected. In order to generate 614 a constituent data set, for example, the computing device 502 may filter the data set 504 based on the current node selection (e.g., based on one or more currently selected nodes 524). In some configurations, the computing device 502 may provide the constituent data set to an output device 530 for display and/or transmission, etc.

The computing device 502 may regenerate 616 any trees 516 that have not had a node selected based on the constituent data set. For example, the computing device 502 may regenerate 502 each tree 516 according to the filtering indicated by the prior node selection 610. For instance, assume that two trees 516 have been generated 606 by the computing device 502, with one tree 516 representing computer attributes and another tree 516 representing software products. Further assume that the computing device 502 selects 610 a Windows Operating System (OS) node 518 in the computer tree 516. The computing device 502 may then regenerate 616 the software product tree 516, eliminating software products that are incompatible with the Windows OS. This is one example of cascading filtering and the regeneration of subsequent filters. One advantage to this approach is that the regenerated products filter/tree 516 may only contain nodes 520 corresponding to criteria pertaining to the resultant data set. Thus, no selection from the regenerated products filter/tree 516 may produce an empty results set and the products filter/tree 516 may have degenerated into a one-node (e.g., root-node 518) tree 516 with only an "all products" root node 518 available. It should be noted that regenerating 616 a tree 516 may comprise re-building the tree from the data set 504 and/or removing one or more nodes 520 based on a constituent data set. The computing device 502 may return to receiving 608 an input and selecting 610 a node from a next tree based on the input.

If the computing device 502 determines 612 that a node (e.g., root node 518 or node 520) has been selected for each tree 516, the computing device 502 may generate 618 a composite filter 522 based on the node selection. For example, the composite filter 522 may include instructions and/or data useable by the computing device 502 to filter the data set 504 as specified by the node selection. In one configuration, the computing device 502 generates a database query based on the node selection. For instance, each selected node 524 may indicate or specify one or more tables, key values, indices, values, columns, rows, cells, search terms and/or other information that will allow an element 506 corresponding to the selected node 524 and/or one or more elements 506 corresponding to one or more descendant nodes to pass into the working data set 526. This may be combined with other information provided by other selected nodes 524 to produce a composite database query (e.g., composite filter 522).

The computing device 502 may filter 620 the data set 504 based on the composite filter 522 to produce a working data set 526. For example, the computing device 502 may retrieve only those elements 506 from the data set 504 that are allowed to pass through the composite filter 522. In one configuration, the computing device 502 may query a database (e.g., the data set 504) and retrieve one or more elements 506 as specified by the composite filter 522. One or more elements 506 from the data set 504 that pass through the composite filter 522 may be used to form the working data set 526. The working data set 526 may be arranged according to some structure. For example, the elements 506 resulting from the filtering operation (if any) may be placed in a table, list, tree, array, graph and/or some other structure.

The computing device 502 may provide 622 the working data set 526 to an output device 530. For example, the computing device 502 may provide 622 the working data set 526 (e.g., information representing the working data set 526, an image of the working data set 526, etc.) to a display device. Additionally or alternatively, the computing device 502 may provide 622 the working data set 526 to an output device 530 for transmission to another electronic device.

Figure 7:
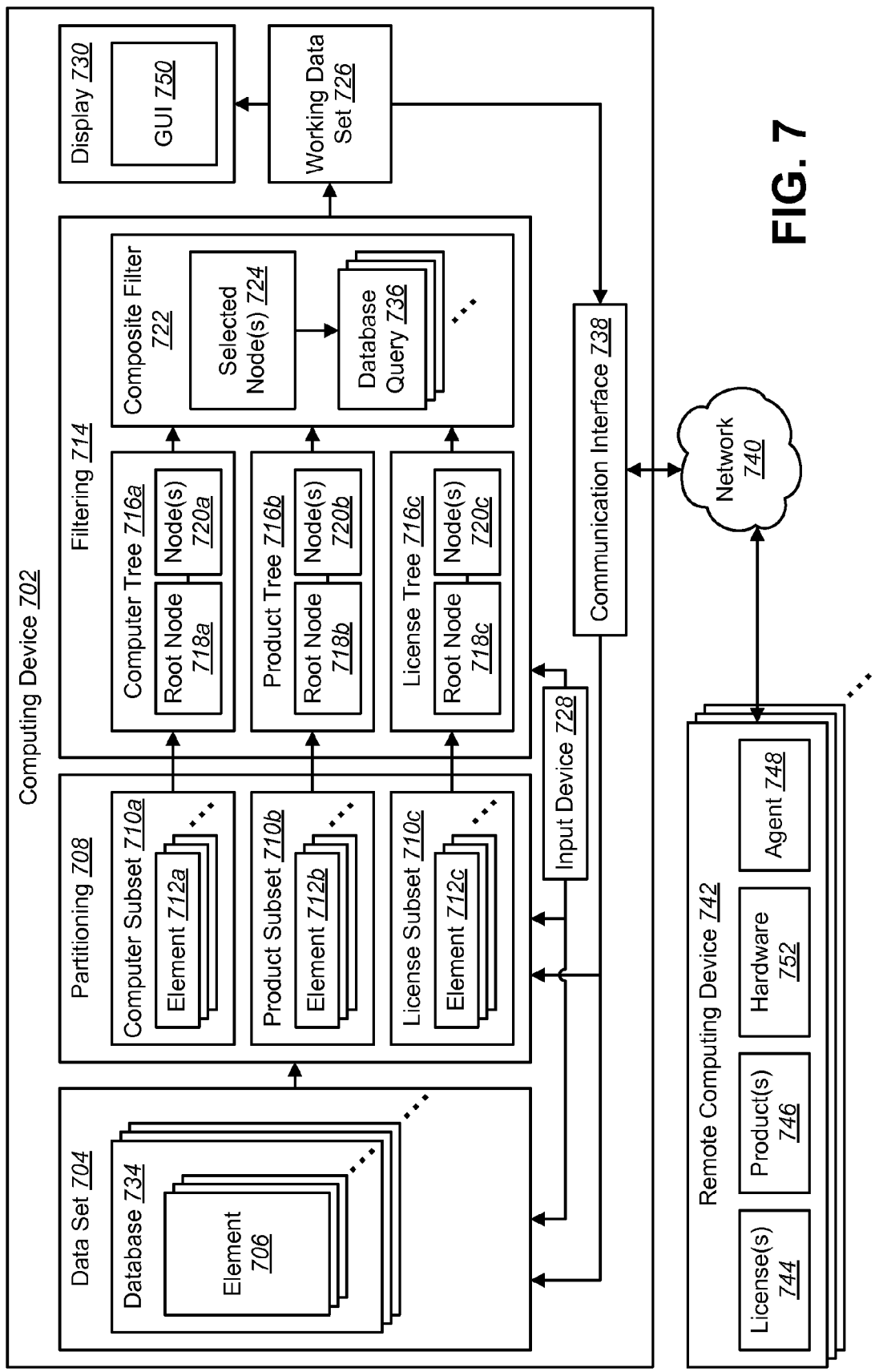
FIG. 7 is a block diagram illustrating an example of a computing device in which systems and methods for filtering a data set may be implemented.

FIG. 7 is a block diagram illustrating an example of a computing device 702 in which systems and methods for filtering a data set may be implemented. In this example, the computing device 702 includes a data set 704, a partitioning block/module 708, a filtering block/module 714, an input device 728, a display 730 and a communication interface 738. The computing device 702 filters the data set 704 to produce a working data set 726.

The input device 728 may be used to receive input from a user of the computing device 702. For example, the input device 728 may comprise a keyboard and/or mouse. The display 730 may be used to display images to a user of the computing device 702. In this example, the display 730 presents a graphical user interface (GUI) 750 to facilitate user interaction. The GUI 750 may be a window with controls and/or icons that a user may interact with using the input device 728 (e.g., a keyboard and/or mouse).

The computing device 702 may be connected to a network 740 using a communication interface 738. The communication interface 738 may be a device used to communicate with one or more remote computing devices 742 using a network 740. More specifically, the communication interface 738 may transmit information to one or more remote computing devices 742 and/or may receive information from one or more remote computing devices 742 using the network 740. The communication interface 738 may used wired and/or wireless communication in order to communicate with the one or more remote computing devices 742. One example of a communication interface 738 is an Ethernet card that can receive information from and send information to one or more remote computing devices 742 connected to the network 740. Examples of the network 740 include Local Area Networks (LANs), the Internet, cellular telephone networks, etc.

In this example, the computing device 702 communicates with one or more remote computing devices 742. Examples of the remote computing devices 742 include desktop computers, laptop computers, servers, supercomputers, smartphones, tablet devices, game consoles, e-readers and/or other devices that include memory and a processor. One or more of the remote computing devices 742 may include one or more licenses 744, one or more products 746, one or more pieces of hardware 752 and/or an agent 748. A license 744 may be data that authorizes and/or enables a remote computing device 742 to run particular software, for example. In one configuration, a product 746 may be a software product, such as a program, application, etc. The hardware 752 may comprise one or more devices used by the remote computing device 742 to operate. Examples of hardware include memory (e.g., hard disk drives, Random Access Memory (RAM), etc.), processors, optical drives, floppy disk drives, buses, video cards, audio cards, power supplies, ports, circuitry, displays, mice, speakers, keyboards, etc. The agent 748 may be a program or application that performs operations on a remote computing device 742 as directed by the computing device 702. For example, the agent 748 may receive a command from the computing device 702 and perform an operation on the remote computing device 742.

The data set 704 may include one or more databases 734. The one or more databases 734 may include a set of information or data that is available to the computing device 702. For example, elements 706 may be stored in the one or more databases 734 in memory (e.g., on a hard drive and/or in Random Access Memory (RAM), etc.) on the computing device 702. In one configuration, the computing device 702 receives information from the one or more remote computing devices 742 for storage in its one or more databases 734.

For example, the computing device 702 may send a request for information regarding the one or more licenses 744, products 746, hardware 752 and/or other information on a remote computing device 742 to an agent 748 using the communication interface 738 and the network 740. The remote computing device 742 (e.g., agent 748) may receive this request. The agent 748 may obtain the requested information from the remote computing device 742 by examining data (e.g., files) on the remote computing device 742. For instance, the agent 748 may retrieve information about one or more licenses 744, products 746, hardware 752 and/or other information, which it 748 may send to the computing device 702 using the network 740. The computing device 702 may receive this information and store it in the one or more databases 734 as elements 706. In this example, the elements 706 may include information about one or more remote computing devices 742, such as information about one or more licenses 744, products 746, hardware 752 and/or other information. This information may be stored in database 734 cells.

The computing device 702 provides the data set 704 to the partitioning block/module 708. The partitioning block/module 708 partitions the data set 704 into a computer subset 710a, a product subset 710b and a license subset 710c. More specifically, the computer subset 710a includes one or more elements 712a (from the database(s) 734) pertaining to the one or more remote computing devices 742, such as information about hardware 752. The product subset 710b includes elements 712b that include information about the product(s) 746 on one or more remote computing devices 742. The license subset 710c includes elements 712c that include information about the license(s) 744 on the one or more remote computing devices 742. In this example, each element 706 in the data set 704 is included in at most one of the computer subset 710a, product subset 710b and license subset 710c. The partitioning block/module 708 may perform this partitioning based on user input from the input device 728. For example, a user may specify that the data set 704 should be partitioned into the three subsets 710a-c described and may additionally or alternatively specify what kinds of information should be included in the subsets 710a-c. The data set 704 and/or the subsets 710a-c may be provided to the filtering block/module 714.

The computing device 702 generates a computer tree 716a corresponding to the computer subset 710a, a product tree 716b corresponding to the product subset 710b and a license tree 716c corresponding to the license subset 710c. For example, the computing device 702 generates a root node 718a for the computer tree 716a, a root node 718b for the product tree 716b and a root node 718c for the license tree 716c. The computing device 702 may also generate each of the nodes 720a in the computer tree 716a based on the elements 712a in the computer subset 710a. Furthermore, the computing device 702 may also generate each of the nodes 720b in the product tree 716b based on the elements 712b in the product subset 710b and may generate each of the nodes 720c in the license tree 716c based on the elements 712c in the license subset 710c.

The computing device 702 may display information related to one or more of the trees 716a-c using the GUI 750 on the display 730. For example, the computing device 702 may represent nodes 720 as text or icons. The computing device 702 may then receive one or more inputs from the input device 728. For example, a user may interact with the computing device 702 by clicking on text or an icon representing a node 720. The computing device 702 may select the corresponding node 720 by adding it to the selected node(s) 724 in the composite filter 722. For example, the computing device 702 may select a node 720a in the computer tree 716a according to an input received from the input device 728.

In one configuration, the computing device 702 generates a constituent data set based on the selected node 720a and regenerates the product tree 716b and the license tree 716c based on the constituent data set. For example, the computing device 702 may remove one or more nodes 720b-c from the product tree 716b and/or the license tree 716c if the node 720a selected from the computer tree 716a narrows the possible nodes 720b-c for selection. Assume, for instance, that the computing device 702 selects a node 720a corresponding to an audio card (e.g., hardware 752) on a remote computing device 742 according to a user input from the input device 728. The computing device 702 may then remove nodes 720b from the product tree 716b that are inapplicable to the audio card, such as hard disk driver software. Furthermore, the computing device 702 may remove nodes 720c from the license tree 716c that are inapplicable to the audio card, such as image processing software licenses.

The computing device 702 may then present information representing the regenerated product tree 716b and/or license tree 716c on the display 730 using the GUI 750. In this configuration, the computing device 702 may then receive another input from the input device 728 indicating a node 720b from the product tree 716b, for example. The computing device 702 may add the indicated node 720b to the selected nodes 724, generate a constituent data set based on the indicated node 720b and regenerate the license tree 716c based on the constituent data set (if one or more nodes 720c may be removed as a result of the indicated node 720b, for example). The computing device 702 may then display information related to the regenerated license tree 716c using the GUI 750. At this point, the computing device 702 may receive yet another input from the input device 728 indicating a node 720c in the license tree 716c. The computing device 702 may add this indicated node 720c to the selected nodes 724 in the composite filter 722.

The multiple selected nodes 724 (corresponding to multiple trees 716a-c) may be used to generate the composite filter 722. The composite filter 722 may be a combination of component filters that are based on the selected nodes 724. The composite filter 722 may only allow elements 706 into the working set 726 as permitted by the combination of the selected nodes 724. For instance, this may allow elements 706 corresponding to each of the selected nodes 724 and their descendant nodes (unless filtered out by another selected node 724). In this example, the selected nodes 724 are used to form one or more database queries 736. For instance, each selected node 724 may be used to form an SQL query 736. In one configuration, multiple SQL queries 736 may be combined into a single (composite) SQL query or statement. Alternatively, a series of SQL queries 736 may be successively performed on the data set 704 and/or query results. The database query (or queries) may be used to retrieve one or more elements 706 from the data set 704 to produce the working data set 726.

The working data set 726 may be provided to the display 730. For example, information representing the working data set 726 (e.g., images based on the working data set 726) may be presented using the GUI 750 on the display 730. For instance, the computing device 702 may output elements 706 from the data set 704 and/or information related to the elements 706 in the working data set 726 (that were not filtered out). Additionally or alternatively, the working data set 726 (or a portion of the working data set 726) may be transmitted to one or more remote computing devices 742 using the network 740.

In a more detailed example of the systems and methods disclosed herein, more specific data may be used. In one configuration, product usage (e.g., "ProductUsage") data may be used (with the product tree 716*b*, for example), which may comprise a record for each installation of a given product on a given remote computing device 742. Additionally or alternatively, license compliance (e.g., "LicenseCompliance") data may be used (with the license tree 716*c*, for example), which may comprise a record for each license that relates to one or more products that could be satisfied with the license and the number of seats of the license. Additionally or alternatively, a computer group (e.g., "ComputerGroup") may be used (with the computer tree 716*a*, for example), which may enable the remote computing devices 742 within that group to consume the license. These types of data may be filtered with the trees 716*a-c*.

Figure 8:
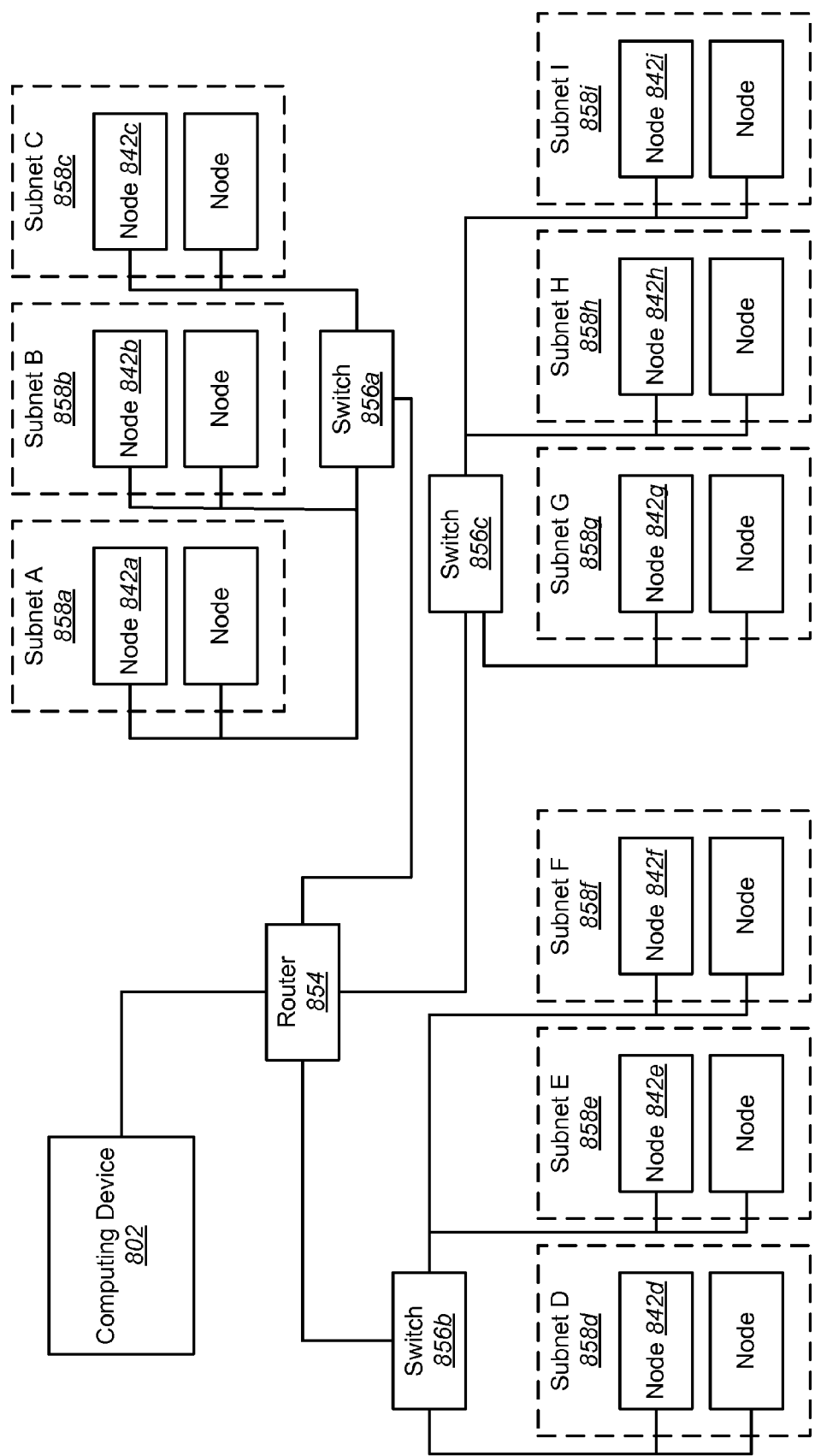
FIG. 8 is a block diagram that illustrates one configuration of a network where a system for filtering a data set on a computing device may be implemented.

FIG. 8 is a block diagram that illustrates one configuration of a network where a system for filtering a data set on a computing device may be implemented. A computing device 802 is connected to a router 854. The router 854 is connected to switches 856*a*, 856*b*, 856*c*. The switch 856*a* is connected to several nodes 842*a*, 842*b*, 842*c*, etc. via their respective subnets 858*a*, 858*b*, 858*c*. The switch 856*b* is connected to several nodes 842*d*, 842*e*, 842*f*, etc. via their respective subnets 858*d*, 858*e*, 858*f*. The switch 856*c* is connected to several nodes 842*g*, 842*h*, 842*i*, etc. via their respective subnets 858*g*, 858*h*, 858*i*. The nodes 842 may be, for example, remote computing devices. For clarity, the nodes 842 illustrated in FIG. 8 may be (remote) computing devices and should not be confused with tree nodes 118, 120, 418, 420, 518, 520, 718, 720 described herein. Although FIG. 8 only shows one router 854 and a limited number of switches 856, subnets 858 and nodes 842, many and varied numbers of routers 854, switches 856, subnets 858 and nodes 842 may be included in networks and/or systems, where a system for filtering a data set on a computing device may be implemented.

Figure 9:
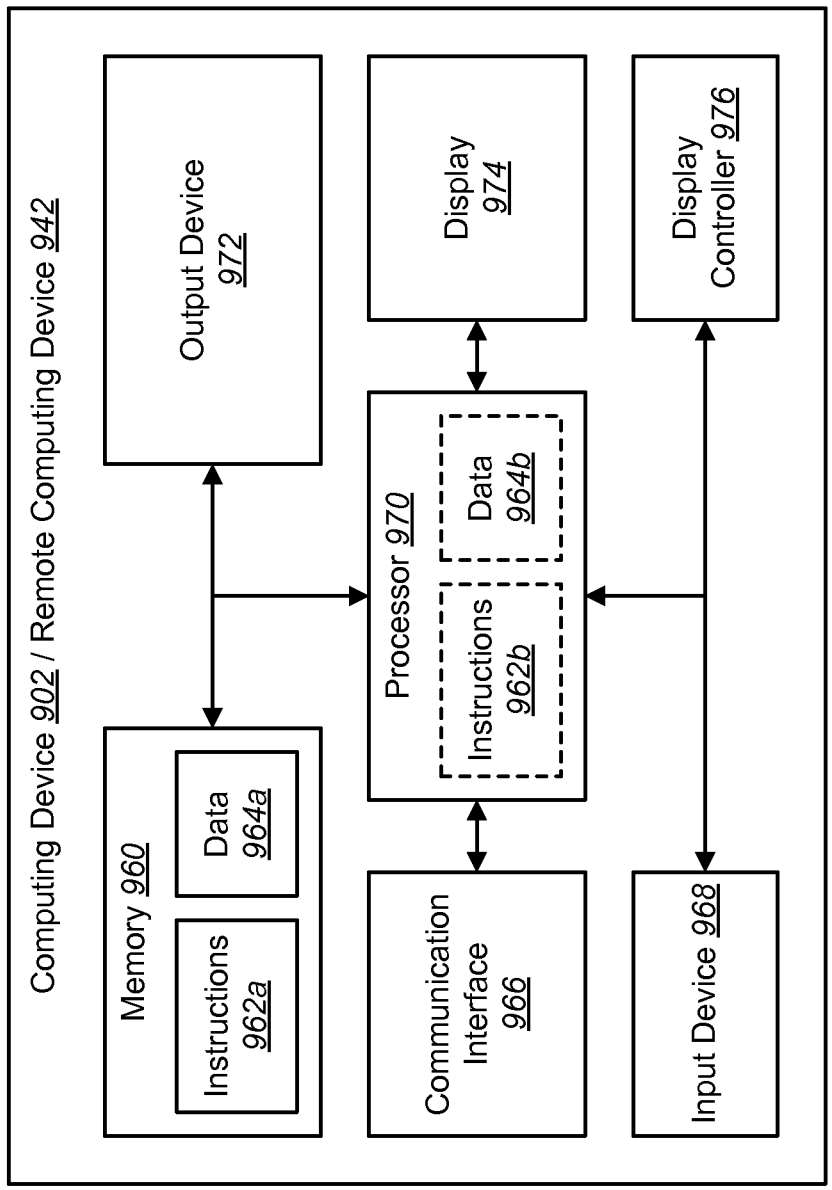
FIG. 9 illustrates various components that may be utilized in a computing device and/or remote computing device.

FIG. 9 illustrates various components that may be utilized in a computing device 902 and/or remote computing device 942. The illustrated components may be located within the same physical structure or in separate housings or structures.

The computing device 902/remote computing device 942 may include a processor 970 and memory 960. The memory 960 may include instructions 962*a* and data 964*a*. The processor 970 controls the operation of the computing device 902/remote computing device 942 and may be, for example, a microprocessor, a microcontroller, a digital signal processor (DSP) or other device known in the art. The processor 970 typically performs logical and arithmetic operations based on program instructions 962*b* and/or data 964*b* it loads from the memory 960.

The computing device 902/remote computing device 942 typically may include one or more communication interfaces 966 for communicating with other electronic devices. The communication interfaces 966 may be based on wired communication technology, wireless communication technology or both. Examples of different types of communication interfaces 966 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter and so forth.

The computing device 902/remote computing device 942 typically may include one or more input devices 968 and one or more output devices 972. Examples of different kinds of input devices 968 include a keyboard, mouse, microphone, remote control device, button, joystick, trackball, touchpad, lightpen, etc. Examples of different kinds of output devices 972 include a speaker, printer, etc. One specific type of output device which may be typically included in a computer system is a display device 974. Display devices 974 used with configurations disclosed herein may utilize any suitable image projection technology, such as a cathode ray tube (CRT), liquid crystal display (LCD), light-emitting diode (LED), gas plasma, electroluminescence or the like. A display controller 976 may also be provided, for converting data stored in the memory 960 into text, graphics, and/or moving images (as appropriate) shown on the display device 974.

Of course, FIG. 9 illustrates only one possible configuration of a computing device 902/remote computing device 942. Various other architectures and components may be utilized.

In the above description, reference numbers have sometimes been used in connection with various terms. Where a term is used in connection with a reference number, this may refer to a specific element that is shown in one or more of the Figures. Where a term is used without a reference number, this may refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers. It should be noted that a computer-readable medium may be non-transitory and tangible.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device configured for filtering a data set, comprising:
    a processor;
    memory in electronic communication with the processor;
    instructions stored in the memory, the instructions being executable to:
        obtain a data set;
        select nodes from multiple trees to produce a node selection;
        generate a composite filter based on the node selection; and
        filter the data set based on the composite filter to produce a working data set.

2. The computing device of claim 1, wherein the instructions are further executable to partition the data set into multiple subsets, wherein each subset exclusively contains at least one element of the data set.

3. The computing device of claim 2, wherein the instructions are further executable to generate the multiple trees corresponding to the multiple subsets.

4. The computing device of claim 1, wherein the instructions are further executable to receive an input.

5. The computing device of claim 4, wherein selecting nodes comprises selecting at least one node based on the input.

6. The computing device of claim 4, wherein the instructions are further executable to modify the node selection based on the input.

7. The computing device of claim 1, wherein the instructions are further executable to regenerate at least one tree based on the node selection.

8. The computing device of claim 1, wherein the instructions are further executable to provide the working data set to an output device.

9. The computing device of claim 1, wherein the instructions are further executable to generate the multiple trees based on the data set.

10. A method for filtering a data set, comprising:
    obtaining a data set;
    selecting, on a computing device, nodes from multiple trees to produce a node selection;
    generating, on the computing device, a composite filter based on the node selection; and
    filtering the data set based on the composite filter to produce a working data set.

11. The method of claim 10, further comprising partitioning the data set into multiple subsets, wherein each subset exclusively contains at least one element of the data set.

12. The method of claim 11, further comprising generating the multiple trees corresponding to the multiple subsets.

13. The method of claim 10, further comprising receiving an input.

14. The method of claim 13, wherein selecting nodes comprises selecting at least one node based on the input.

15. The method of claim 13, wherein the instructions are further executable to modify the node selection based on the input.

16. The method of claim 10, further comprising regenerating at least one tree based on the node selection.

17. The method of claim 10, further comprising providing the working data set to an output device.

18. The method of claim 10, further comprising generating the multiple trees based on the data set.

19. A non-transitory tangible computer-readable medium for filtering a data set comprising executable instructions for:
    obtaining a data set;
    selecting nodes from multiple trees to produce a node selection;
    generating a composite filter based on the node selection; and
    filtering the data set based on the composite filter to produce a working data set.

* * * * *